(12) United States Patent
Huang et al.

(10) Patent No.: US 9,622,305 B2
(45) Date of Patent: Apr. 11, 2017

(54) WLED DRIVER AND DRIVE CONTROL METHOD

(71) Applicant: Huawei Technologies Co., Ltd., Shenzhen, Guangdong (CN)

(72) Inventors: Dongqi Huang, Shenzhen (CN); Xiao Yu, Shenzhen (CN); Hui Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/147,575

(22) Filed: May 5, 2016

(65) Prior Publication Data

US 2016/0249423 A1 Aug. 25, 2016

Related U.S. Application Data

(63) Continuation of application No. PCT/CN2015/079808, filed on May 26, 2015.

(30) Foreign Application Priority Data

Nov. 21, 2014 (CN) .......................... 2014 1 0675680

(51) Int. Cl.
*H05B 37/02* (2006.01)
*H05B 33/08* (2006.01)

(52) U.S. Cl.
CPC ..... *H05B 33/0815* (2013.01); *H05B 33/0827* (2013.01); *H05B 33/0845* (2013.01); *Y02B 20/42* (2013.01)

(58) Field of Classification Search
CPC ............ H05B 41/3925; H05B 41/2828; H05B 41/28; H05B 41/2827; H05B 41/285;
(Continued)

(56) References Cited

U.S. PATENT DOCUMENTS

| 7,781,983 B1 | 8/2010 | Yu et al. |
| 2002/0039096 A1 | 4/2002 | Katsutani |

(Continued)

FOREIGN PATENT DOCUMENTS

| CN | 200947689 Y | 9/2007 |
| CN | 101217263 A | 7/2008 |

(Continued)

*Primary Examiner* — Minh D A

(57) ABSTRACT

A WLED driver and a drive control method. The WLED driver includes $2N^2$ switches, and each CS module includes 2N switches, where one end of each of N switches in the 2N switches is connected to an output end of an error amplifier, another end of each of the N switches is connected to a gate of each of N NMOS transistors, one end of each of remaining N switches is connected to a negative input end of the error amplifier, and another end of each of the remaining N switches is connected to a positive input end of each of N feedback resistors. After a control circuit generates a clock control signal group $\Phi_{group}$, the control circuit controls switching actions of the $2N^2$ switches on a time-division basis according to the clock control signal group $\Phi_{group}$.

4 Claims, 5 Drawing Sheets

(58) Field of Classification Search
CPC .............. H05B 37/029; H05B 33/0803; H05B 37/0254; H05B 37/02; H05B 33/0818
USPC .................... 315/185 R, 224, 291, 294, 312
See application file for complete search history.

(56) References Cited

U.S. PATENT DOCUMENTS

2011/0127925 A1   6/2011   Huang et al.
2012/0188487 A1*  7/2012   Hagino .............. H05B 33/0812
                                                  349/69

FOREIGN PATENT DOCUMENTS

| | | |
|---|---|---|
| CN | 102083254 A | 6/2011 |
| CN | 102136827 A | 7/2011 |
| CN | 202218446 U | 5/2012 |
| CN | 203179477 U | 9/2013 |
| CN | 103428969 A | 12/2013 |
| CN | 103889088 A | 6/2014 |
| CN | 104602396 A | 5/2015 |
| EP | 2 648 483 A1 | 10/2013 |
| TW | 201220925 A | 5/2012 |

* cited by examiner

WLED DRIVER AND DRIVE CONTROL METHOD

CROSS-REFERENCE TO RELATED APPLICATIONS

This application is a continuation of International Application No. PCT/CN2015/079808, filed on May 26, 2015, which claims priority to Chinese Patent Application No. 201410675680.7, filed on Nov. 21, 2014, both of which are hereby incorporated by reference in their entireties.

TECHNICAL FIELD

The present invention relates to the field of technologies for controlling a current mismatch between channels in a white light emitting diode (WLED) driver, and in particular, to a WLED driver and a drive control method.

BACKGROUND

A WLED (White Light Emitting Diode, white light emitting diode) has advantages of a small size, pure light color, high light emitting efficiency, long service life, and the like, and is extensively applied in technical fields of display screen backlight, lighting, and the like, and in particular, is applied in mobile devices such as a smartphone and a tablet computer. Compared with other backlight technologies, it may significantly reduce a volume and weight of a device, and prolong a discharge time of a battery.

When working, the WLED requires a WLED driver and an input power source, where the WLED driver is integrated with a chip, and connected externally to a few peripheral components. In an actual application, to ensure consistency of luminance of multiple WLEDs while taking simplification of a WLED driver circuit and reduction of power consumption into account, generally, the multiple WLEDs are made into a WLED string or array. In terms of process and circuit feasibility, generally, a quantity of WLEDs that can be connected in series in one WLED string or array is approximately 11. For a device having a screen size of 4 to 6 inches, one WLED string including 11 WLEDs can meet an application requirement of the device. However, for a device having a screen size of more than 6 inches, such as a large-screen smartphone, a tablet computer, or a notebook computer, one WLED string cannot meet an application requirement of the device. Based on this, the prior art further proposes a WLED driver integrating multiple WLED string channels, where each channel corresponds to one WLED string. Therefore, when there are more channels, more WLED strings can be driven simultaneously.

As shown in FIG. 1, which shows a schematic structural diagram of a WLED driver in the prior art, the WLED driver includes a DC-DC CONVERTER (boost converter), a control circuit, and two precise programmable-controlled CSs (Current Sink, current sink 1, where the DC-DC CONVERTER is configured to regulate an output voltage $V_{OUT}$ to an appropriate value according to a quantity of WLEDs mounted on any channel, the first current sink CS1 is connected to the first channel IFB1, the second current sink CS2 is connected to the second channel IFB2, and each CS is configured to determine a current intensity of a WLED string corresponding to a channel to which the CS is connected. In an ideal case, the current determined by the CS and a reference voltage $V_{REF}$ are in a preset proportional relationship.

CS precision of each channel is a key to ensuring consistency of luminance of WLED strings between channels. Generally, a CS implementation manner is to connect a high-gain operational amplifier and a power stage to form a unit negative feedback loop. However, in an actual application process, a mismatch between an input offset voltage of the operational amplifier and a feedback resistance of the power stage may cause a current difference between different channels in the WLED driver. For a present integrated circuit manufacturing process, it is easier to implement a good match of feedback resistances, but the input offset voltage of the operational amplifier has relatively great impact on a current mismatch between channels in the WLED driver. Therefore, in the prior art, to achieve consistency of luminance of WLED strings between multiple channels, a key lies in elimination of the channel current mismatch caused by the input offset voltage of the operational amplifier.

Still using FIG. 1 as an example, in the prior art, to reduce the current mismatch between the two channels IFB1 and IFB2, it is necessary to introduce an error amplifier (EA, error amplifier) with a low input offset voltage. For a CMOS (Complementary Metal Oxide Semiconductor, complementary metal oxide semiconductor) process, the input offset voltage of the error amplifier is approximately several millivolts to tens of millivolts. A method for reducing the input offset voltage of the error amplifier is to make sizes of components in the error amplifier greater. However, this causes a die size of a chip to increase, which is disadvantageous for cost control, and cannot completely eliminate the current mismatch between channels. In addition, a trimming circuit may be added to an error amplifier circuit in the prior art to reduce the input offset voltage of the error amplifier. However, this method requires that trimming should be performed on each error amplifier separately, which increases the circuit complexity and cost.

Therefore, the prior art urgently requires a method for implementing an exact current match between multiple channels integrated in a WLED driver under a prerequisite that the input offset voltage of the error amplifier is not eliminated, to ensure consistency of luminance of WLEDs between multiple channels.

SUMMARY

In view of this, the present invention provides a WLED driver and a drive control method to provide a method for implementing an exact current match between multiple channels integrated in the WLED driver under a prerequisite that an input offset voltage of an error amplifier is not eliminated, to ensure consistency of luminance of WLEDs between multiple channels. Technical solutions are as follows:

According to a first aspect, the present invention provides a WLED driver, including a boost converter, a controller, and N channels, where N is a positive integer that is greater than 1, and each channel includes a current sink CS module, where the CS module is configured to drive a WLED string, and the CS module includes an error amplifier EA, an n-type metal-oxide-semiconductor NMOS transistor, and a feedback resistor, where: the WLED driver includes a total of $2N^2$ switches, and each CS module includes 2N switches, where the $2N^2$ switches constitute a switch matrix $S_G = S_g(i, j)$ and a switch matrix $S_{FB} = S_{fb}(i, j)$, where $S_g(i, j)$ is a switch between an output end of an error amplifier in an $i^{th}$ CS module and a gate of an NMOS transistor in a $j^{th}$ CS module, $S_{fb}(i, j)$ is a switch between a negative input end of the error amplifier in the $i^{th}$ CS module and a positive input end of a feedback resistor in the $j^{th}$ CS module, and both i and j are positive integers that are less than or equal to N;

the boost converter is configured to regulate an output voltage of the WLED driver according to a maximum quantity of WLEDs in a WLED string corresponding to any channel;

one end of each of N switches in the 2N switches included in the CS module is connected to an output end of the error amplifier, another end of each of the N switches is connected to a gate of each of N NMOS transistors, one end of each of remaining N switches is connected to a negative input end of the error amplifier, another end of each of the remaining N switches is connected to a positive input end of each of N feedback resistors, and the CS module is configured to determine a value of a current flowing through the WLED string on the channel; and the control circuit is configured to generate a clock control signal group $\Phi_{group}$, and control switching actions of the $2N^2$ switches on a time-division basis according to the clock control signal group $\Phi_{group}$, so that in a clock period T, an input offset voltage of the error amplifier is evenly applied on each channel in sequence on a time-division basis; where the clock control signal group $\Phi_{group}=(\Phi_1, \Phi_2, \ldots, \Phi_N)$, the clock control signal group $\Phi_{group}$ includes N clock signals $\Phi$, the N clock signals $\Phi$ are non-overlapping N-phase clock signals $\Phi$ of a same source, a clock signal $\Phi_{i+j}$ has a delay of $j \times T/N$ in comparison with $\Phi_i$, and T is a clock period of each phase clock.

In a first possible implementation manner of the first aspect, the control circuit is specifically configured to control, According to the clock signal $\Phi_i$, turn-on of switches in $[S_g 1i, S_g 2(i+1), S_g(n-i+1)n, S_g(n-i+2)1, \ldots, S_g n(i-1)]$ in the switch matrix $S_G$, and turn-off of other switches in the switch matrix SG in the switch matrix $S_G$; and control turn-on of switches $[S_{fb} 1i, S_{fb} 2(i+1), \ldots, S_{fb}(n-i+1)n, S_{fb}(n-i+2)1, \ldots, S_{fb} n(i-1)]$ in the switch matrix $S_{FB}$, and turn-off of other switches in the switch matrix SG in the switch matrix $S_{FB}$.

With reference to the first possible implementation manner of the first aspect, in a second possible implementation manner, the N is 2, 3, or 4.

According to a second aspect, the present invention provides a drive control method for a WLED driver, applied to a WLED driver, where the WLED driver includes N channels, where N is a positive integer that is greater than 1, and each channel includes a current sink CS module, where the CS module is configured to drive a WLED string, and the CS module includes an error amplifier EA, a metal-oxide-semiconductor NMOS transistor, and a feedback resistor, where: each CS module includes 2N switches, and the WLED driver includes a total of $2N^2$ switches, where one end of each of N switches in the 2N switches included in the CS module is connected to an output end of the error amplifier, another end of each of the N switches is connected to a gate of each of N NMOS transistors, one end of each of remaining N switches is connected to a negative input end of the error amplifier, another end of each of the remaining N switches is connected to a positive input end of each of N feedback resistors, and the $2N^2$ switches constitute a switch matrix $S_G=S_g(i, j)$ and a switch matrix $S_{FB}=S_{fb}(i, j)$, where $S_g(i, j)$ is a switch between an output end of an error amplifier in an $i^{th}$ CS module and a gate of an NMOS transistor in a $j^{th}$ CS module, $S_{fb}(i, j)$ is a switch between a negative input end of the error amplifier in the $i^{th}$ CS module and a positive input end of a feedback resistor in the $j^{th}$ CS module, and both i and j are positive integers that are less than or equal to N; and the method includes:

generating a clock control signal group $\Phi_{group}$, where the clock control signal group $\Phi_{group}=(\Phi_1, \Phi_2, \ldots, \Phi_N)$, the clock control signal group $\Phi_{group}$ includes N clock signals $\Phi$, the N clock signals $\Phi$ are non-overlapping N-phase clock signals $\Phi$ of a same source, a clock signal $\Phi_{i+j}$ has a delay of $j \times T/N$ in comparison with $\Phi_i$, and T is a clock period of each phase clock; and controlling switching actions of the $2N^2$ switches on a time-division basis according to the clock control signal group $\Phi_{group}$, so that in a clock period T, an input offset voltage of the error amplifier is evenly applied on each channel in sequence on a time-division basis.

In a first possible implementation manner of the second aspect, the controlling switching actions of the $2N^2$ switches on a time-division basis according to the clock control signal group $\Phi_{group}$ specifically includes:

controlling, according to the clock signal $\Phi_i$, turn-on of switches in $[S_g 1i, S_g 2(i+1), \ldots, S_g(n-i+1)n, S_g(n-i+2)1, \ldots, S_g n(i-1)]$ in the switch matrix $S_G$, and turn-off of other switches in the switch matrix SG in the switch matrix $S_G$; and controlling turn-on of switches $[S_{fb} 1i, S_{fb} 2(i+1), \ldots, S_{fb}(n-i+1)n, S_{fb}(n-i+2)1, \ldots, S_{fb} n(i-1)]$ in the switch matrix $S_{FB}$, and turn-off of other switches in the switch matrix SG in the switch matrix $S_{FB}$.

With reference to the first possible implementation manner of the second aspect, in a second possible implementation manner, the N is 2, 3, or 4.

According to the foregoing technical solutions of the present invention, a WLED driver includes $2N^2$ switches, and each CS module includes 2N switches. Specifically, one end of each of N switches in the 2N switches included in the CS module is connected to an output end of an error amplifier, another end of each of the N switches is connected to a gate of each of N NMOS transistors, one end of each of remaining N switches is connected to a negative input end of the error amplifier, and another end of each of the remaining N switches is connected to a positive input end of each of N feedback resistors. After a control circuit generates a clock control signal group $\Phi_{group}$, the control circuit controls switching actions of the $2N^2$ switches on a time-division basis according to the clock control signal group $\Phi_{group}$, so that in a clock period T, an input offset voltage of the error amplifier is evenly applied on each channel in sequence on a time-division basis. Therefore, a problem of a current mismatch between channels that is caused by the input offset voltage of the error amplifier is eliminated, and thereby consistency of luminance of WLEDs between multiple channels is ensured.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely the embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
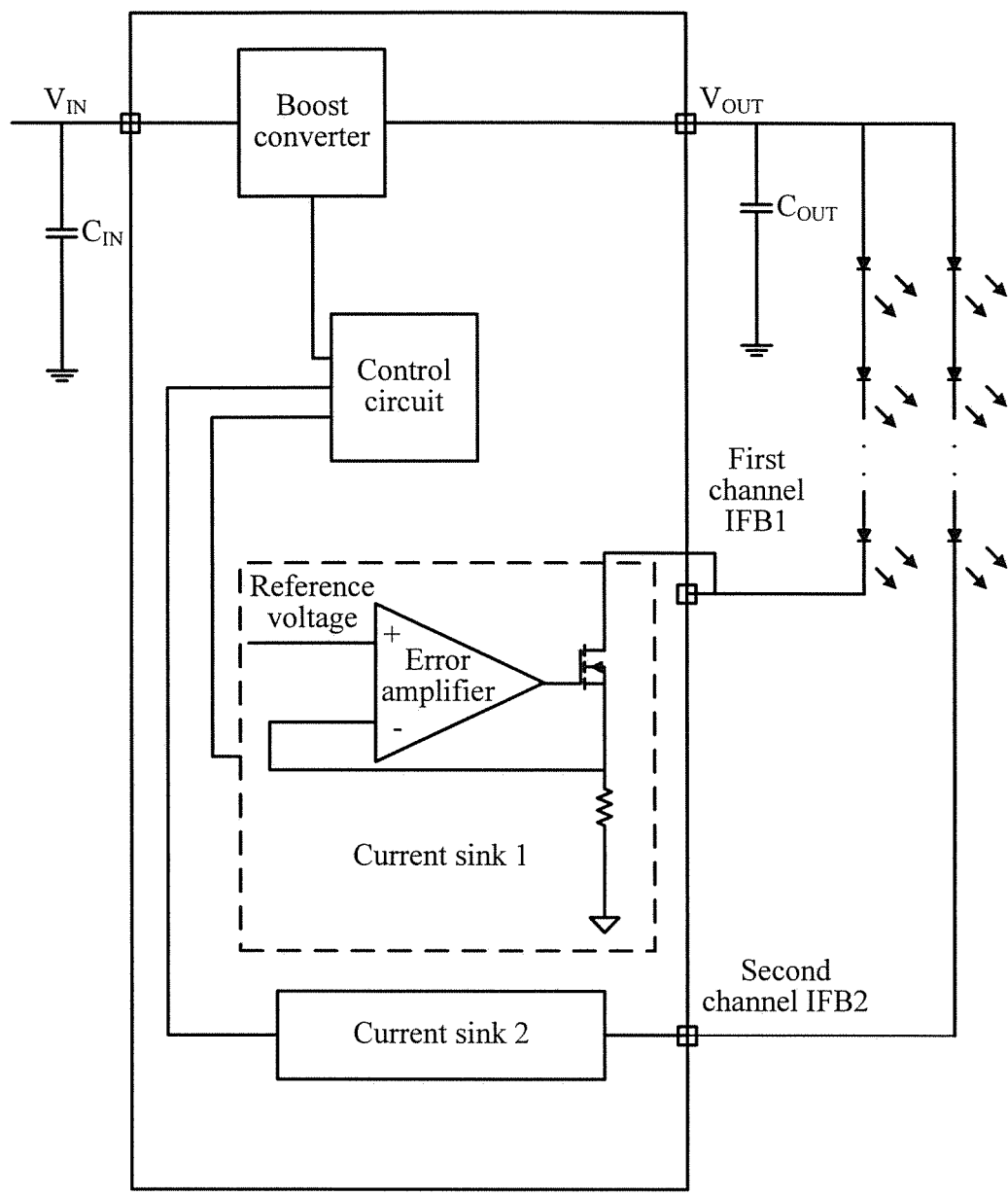
FIG. 1 is a schematic structural diagram of a WLED driver in the prior art.
Figure 2:
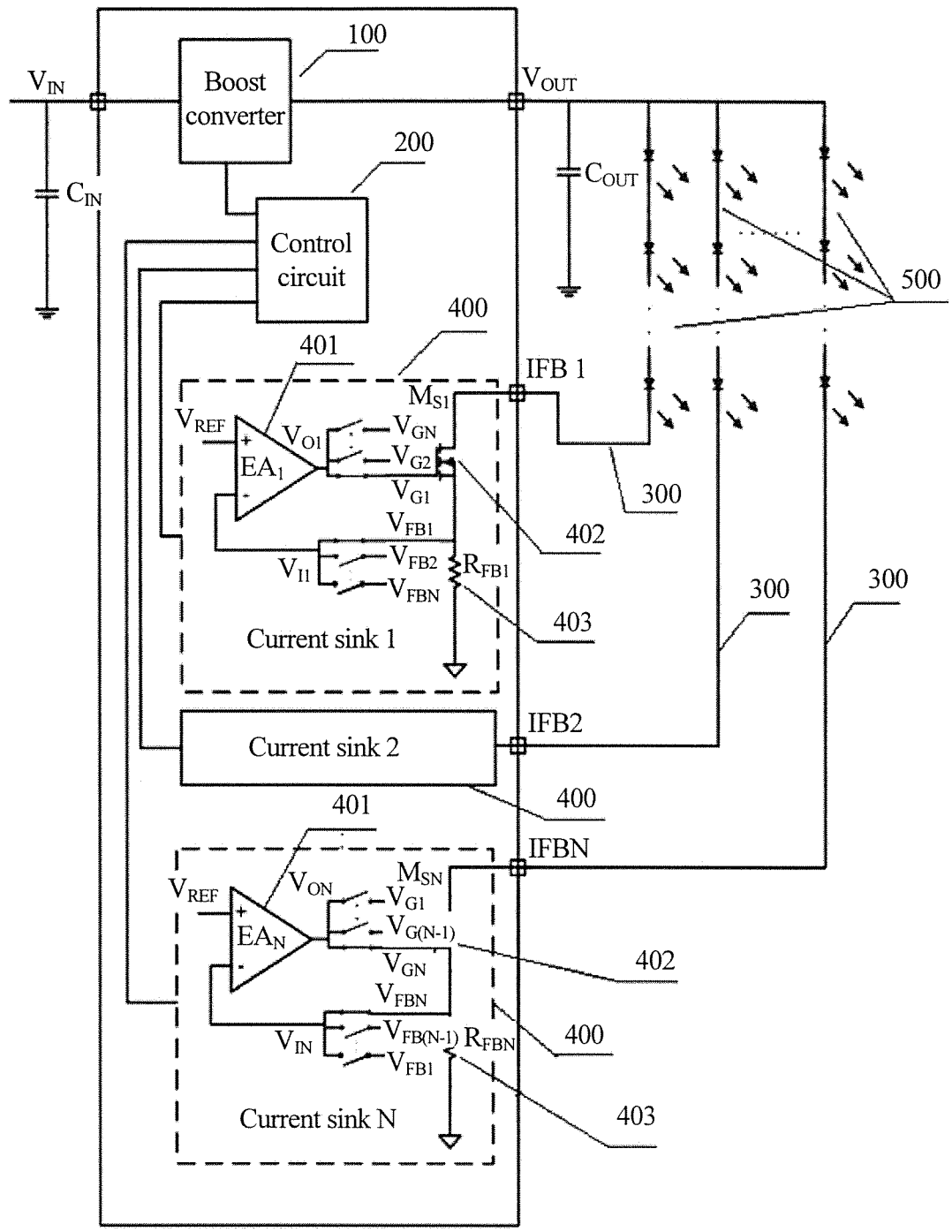
FIG. 2 is a schematic structural diagram of a WLED driver according to the present invention.

Referring to FIG. 2, which shows a schematic structural diagram of a WLED driver according to the present invention, the WLED driver includes a boost converter 100, a control circuit 200, and N channels 300, where each channel 300 includes a CS (current sink) module 400, the CS module 400 is configured to drive a WLED string 500, and N is a positive integer that is greater than 1.

The CS module 400 includes an EA (error amplifier, error amplifier) 401, an n-type Metal-Oxide-Semiconductor (NMOS) transistor 402, and a feedback resistor $R_{FB}$403. In the present invention, each CS module 400 further includes 2N switches, where one end of each of N switches is connected to an output end of the EA 401, another end of each of the N switches is connected to a gate of each of N NMOS transistors 402, one end of each of remaining N switches is connected to a negative input end of the EA401, and another end of each of the remaining N switches is connected to a positive input end of each of N feedback resistors $R_{FB}$403.

For ease of clear description, in the present invention, the N CS modules 400 are defined as a CS1 module 400, a CS2 module 400, a CS3 module 400, . . . , a CSn module 400. Correspondingly, an NMOS transistor 402 located in the CS1 module 400 is defined as $M_{s1}$, a feedback resistor $R_{FB}$403 located in the CS1 module 400 is defined as $R_{FB1}$, an NMOS transistor 402 located in the CS2 module 400 is defined as $M_{s2}$, a feedback resistor $R_{FB}$403 located in the CS2 module 400 is defined as $R_{FB2}$, . . . , an NMOS transistor 402 located in the CSn module 400 is defined as $M_{sn}$, and a feedback resistor $R_{FB}$403 located in the CSn module 400 is defined as $R_{FBn}$. In addition, a channel including the CS1 module 400 is defined as IFB1, a channel including the CS2 module 400 is defined as IFB2, and a channel including the CSn module 400 is defined as IFBn.

Figure 3:
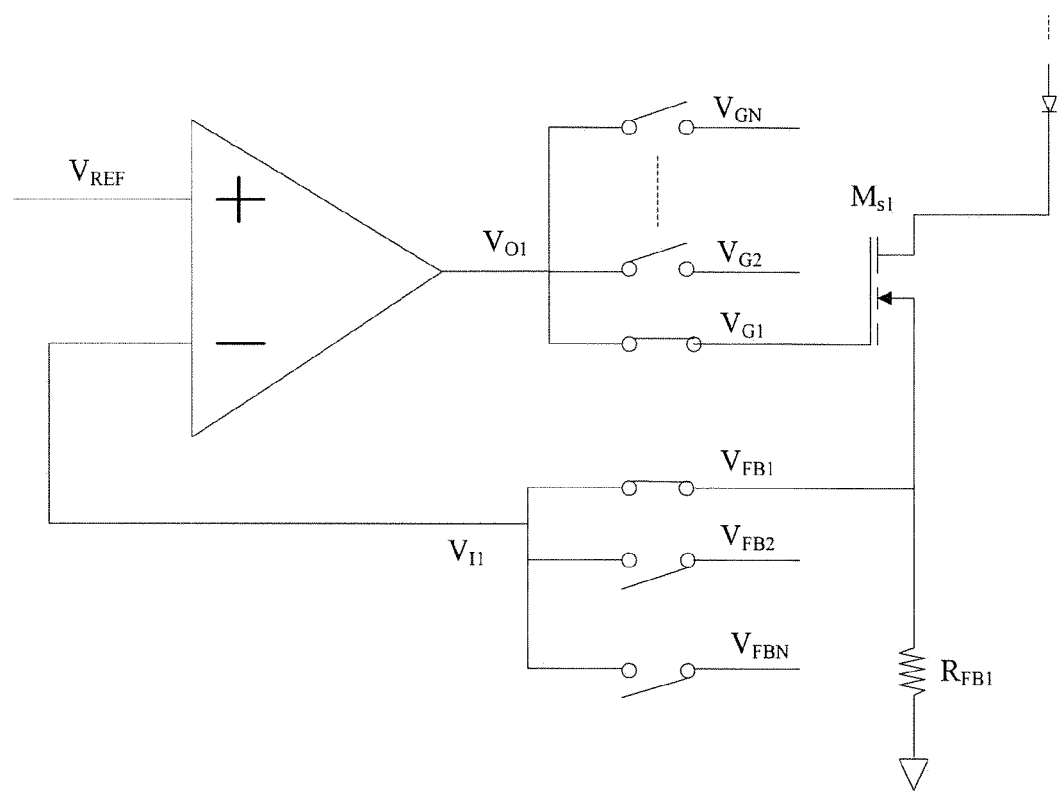
FIG. 3 is a schematic diagram of specific connections of a CS1 module according to the present invention.

Further, in the present invention, the CS1 module 400 is used as an example to describe in detail a specific manner of setting switches in each CS module 400, as shown in FIG. 3.

As seen from the figure, N switches exist between an output end of an EA1 and the $M_{s1}$. Actually, one end of a switch $V_{G1}$ is connected to the output end of the EA1, while another end of the switch $V_{G1}$ is connected to a gate of the $M_{s1}$; one end of a switch $V_{G2}$ is connected to the output end of the EA1, while another end of the switch $V_{G2}$ is connected to a gate of the $M_{s2}$; and likewise, one end of a switch $V_{GN}$ is connected to the output end of the EA1, while another end of the switch $V_{GN}$ is connected to a gate of the $M_{sn}$. Therefore, by controlling turn-on and turn-off of the N switches existing between the output end of the EA1 and the $M_{s1}$ in the figure, connections between the EA1 and gates of NMOS transistors 402 in different CS modules 400 may be implemented.

In addition, as seen from the figure, N switches exist between a negative input end of the EA1 and positive input ends of N feedback resistors. Actually, one end of a switch $V_{FB1}$ is connected to the negative input end of the EA1, while another end of the switch VG1 is connected to a positive input end of the $R_{FB1}$; one end of a switch $V_{FB2}$ is connected to the negative input end of the EA1, while another end of the switch $V_{FB2}$ is connected to a positive input end of the $R_{FB2}$; likewise, one end of a switch $V_{FBN}$ is connected to the negative input end of the EA1, while another end of the switch $V_{FBN}$ is connected to a positive input end of the $R_{FBN}$. Therefore, by controlling turn-on and turn-off of the N switches existing between the negative input end of the EA1 and the N feedback resistors in the figure, connections between the EA1 and positive input ends of the feedback resistors $R_{FB}$403 in different CS modules 400 may be implemented.

Because the WLED driver in the present invention includes a total of N CS modules 400, and each CS module 400 includes 2N switches, the WLED driver in the present invention includes a total of $2N^2$ switches. For ease of controlling switching of the $2N^2$ switches, in the present invention, the $2N^2$ switches are represented by two N×N switch matrices $S_G$ and $S_{FB}$, where switch matrix $S_G=S_g(i, j)$, and switch matrix $S_{FB}=S_{fb}(i, j)$. Specifically, $S_g(i, j)$ is a switch between an output end $V_{Oi}$ of an error amplifier 401 in an $i^{th}$ CS module 400 and a gate of an NMOS transistor 402 in a $j^{th}$ CS module 400, $S_{fb}(i, j)$ is a switch between a negative input end of the error amplifier 401 in the $i^{th}$ CS module 400 and a positive input end of a feedback resistor 403 in the $j^{th}$ CS module 400, and both i and j are positive integers that are less than or equal to N.

Specifically, in the present invention, an input voltage $V_{IN}$ of the WLED driver generally does not meet a requirement for driving a WLED string. Therefore, a boost convert 100 is included in the WLED driver, and configured to regulate an output voltage $V_{OUT}$ of the WLED driver according to a maximum quantity of WLEDs in a WLED string corresponding to any channel 300.

The CS module 400 is specifically configured to determine a value of a current flowing through the WLED string corresponding to the channel 300. In an actual application process, the CS module 400 is generally a precise programmable-controlled CS module.

The control circuit 200 is configured to generate a clock control signal $\Phi_{group}$, and control switching actions of the $2N^2$ switches on a time-division basis according to the clock control signal group $\Phi_{group}$, so that in a clock period T, an input offset voltage of the error amplifier is evenly applied on each channel in sequence on a time-division basis.

The clock control signal group $\Phi_{group}=(\Phi_1, \Phi_2, \ldots, \Phi_N)$, the clock control signal group $\Phi_{group}$ includes N clock signals $\Phi$, the N clock signals $\Phi$ are non-overlapping N-phase clock signals $\Phi$ of a same source, a clock signal $\Phi_{i+j}$ has a delay of j×T/N in comparison with $\Phi_i$, and T is a clock period of each phase clock.

Figure 4:
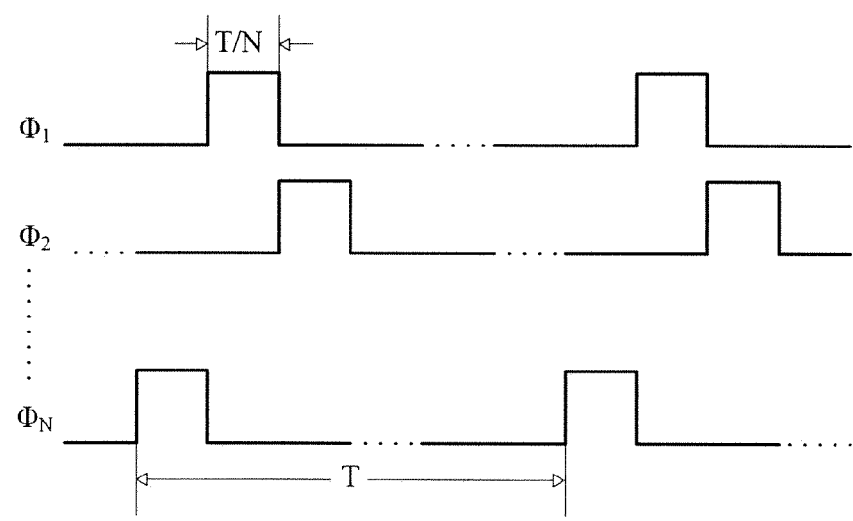
FIG. 4 is a schematic waveform diagram of a clock control signal group $\Phi_{group}$ according to the present invention.

FIG. 4 shows a schematic waveform diagram of a clock control signal group $\Phi_{group}$ according to the present invention. A clock period of each phase clock signal $\Phi$ is T, a duty cycle is 1/N, and there is a delay of T/N between adjacent clock signals $\Phi$. Herein it should be noted that a clock period T of a clock signal $\Phi$ may be set freely, so long as blinking of WLEDs cannot be perceived by human eyes in principle.

Further, the control circuit 200 in the present invention is specifically configured to control, according to the clock signal $\Phi_i$, turn-on of switches in [$S_g1i$, $S_g2(i+1)$, ..., $S_g(n-i+1)n$, $S_g(n-i+2)1$, ..., $S_gn(i-1)$] in the switch matrix $S_G$, and turn-off of other switches in the switch matrix SG in the switch matrix $S_G$; and control turn-on of switches [$S_{fb}1i$, $S_{fb}2(i+1)$, ..., $S_{fb}(n-i+1)n$, $S_{fb}(n-i+2)1$, ..., $S_{fb}n(i-1)$] in the switch matrix $S_{FB}$, and turn-off of other switches in the switch matrix SG in the switch matrix $S_{FB}$. Specifically, when the clock signal $\Phi_i$ is at a high level, the control circuit is configured to controls turn-on or turn-off of related switches in the switch matrices $S_G$ and $S_{FB}$.

Specifically, in the present invention,
when a clock signal $\Phi_1$ is received, and the $\Phi_1$ is at a high level:
control turn-on of switches [$S_g11$, $S_g22$, ..., $S_gnn$] in the switch matrix $S_G$, and turn-off of other switches in the switch matrix SG; and
control turn-on of switches [$S_{fb}11$, $S_{fb}22$, ..., $S_{fb}nn$] in the switch matrix $S_{FB}$, and turn-off of other switches in the switch matrix SG;
when a clock signal $\Phi_2$ is received, and the $\Phi_2$ is at a high level:
control turn-on of switches [$S_g12$, $S_g23$, ..., $S_g(n-1)n$, $S_gn1$] in the switch matrix $S_G$, and turn-off of other switches in the switch matrix SG; and
control turn-on of switches [$S_{fb}12$, $S_{fb}23$, ..., $S_{fb}(n-1)n$, $S_{fb}n1$] in the switch matrix $S_{FB}$, and turn-off of other switches in the switch matrix SG;
when a clock signal $\Phi_i$ is received, and the $\Phi_i$ is at a high level:
control turn-on of switches [$S_g1i$, $S_g2(i+1)$, ..., $S_g(n-i+1)n$, $S_g(n-i+2)1$, ..., $S_gn(i-1)$] in the switch matrix $S_G$, and turn-off of other switches in the switch matrix SG; and
control turn-on of switches [$S_{fb}1i$, $S_{fb}2(i+1)$, ..., $S_{fb}(n-i+1)n$, $S_{fb}(n-i+2)1$, ..., $S_{fb}n(i-1)$] in the switch matrix $S_{FB}$, and turn-off of other switches in the switch matrix SG; and
when a clock signal $\Phi_N$ is received, and the $\Phi_N$ is at a high level:
control turn-on of switches [$S_g1n$, $S_g21$, ..., $S_g(n-1)(n-2)$, $S_g n(n-1)$] in the switch matrix $S_G$, and turn-off of other switches in the switch matrix SG; and
control turn-on of switches [$S_{fb}1n$, $S_{fb}21$, ..., $S_{fb}(n-1)(n-2)$, $S_{fb}n(n-1)$] in the switch matrix $S_{FB}$, and turn-off of other switches in the switch matrix SG.

Assuming that a loop gain of each CS module 400 in the present invention is high enough, and that input offset voltages of an EA1, an EA2, ..., EAN are $V_{OS1}$, $V_{OS2}$, ..., $V_{OSN}$ respectively, then in a clock period T, an average current flowing through each CS module 400 is:

$$I_{S1\_AVG} = \frac{1}{N}\left(\frac{V_{REF}+V_{OS1}}{R_{FB1}} + \frac{V_{REF}+V_{OS2}}{R_{FB1}} + ... + \frac{V_{REF}+V_{OSN}}{R_{FB1}}\right),$$

$$I_{S2\_AVG} = \frac{1}{N}\left(\frac{V_{REF}+V_{OS1}}{R_{FB2}} + \frac{V_{REF}+V_{OS2}}{R_{FB2}} + ... + \frac{V_{REF}+V_{OSN}}{R_{FB2}}\right), \text{ and}$$

-continued $$I_{SN\_AVG} = \frac{1}{N}\left(\frac{V_{REF}+V_{OS1}}{R_{FBN}} + \frac{V_{REF}+V_{OS2}}{R_{FBN}} + ... + \frac{V_{REF}+V_{OSN}}{R_{FBN}}\right).$$

Apparently, the input offset voltage of each EA401 has same impact on the average current of each CS module 400 in the present invention. To eliminate a problem of a current mismatch between multiple channels 300 in the WLED driver and achieve consistency of luminance of WLEDs between the multiple channels 300, it is only necessary to ensure a good match of feedback resistors $R_{FB}$403 in the CS modules 400.

Therefore, according to the foregoing technical solution of the present invention, a WLED driver includes $2N^2$ switches, and each CS module 400 includes 2N switches. Specifically, one end of each of N switches in the 2N switches included in the CS module 400 is connected to an output end of an error amplifier 401, another end of each of the N switches is connected to a gate of each of N NMOS transistors 402, one end of each of remaining N switches is connected to a negative input end of the error amplifier 401, and another end of each of the remaining N switches is connected to a positive input end of each of N feedback resistors 403. After a control circuit 200 generates a clock control signal group $\Phi_{group}$, the control circuit 200 controls switching actions of the $2N^2$ switches on a time-division basis according to the clock control signal group $\Phi_{group}$, so that in a clock period T, an input offset voltage of the error amplifier 401 is evenly applied on each channel 300 in sequence on a time-division basis. Therefore, a problem of a current mismatch between channels 300 that is caused by the input offset voltage of the error amplifier 401 is eliminated, and thereby consistency of luminance of WLEDs between multiple channels is ensured.

Preferably, in the present invention, N is equal to 2, 3, or 4. The present invention is hereinafter described in detail by using N=2 as an example.

Figure 5:
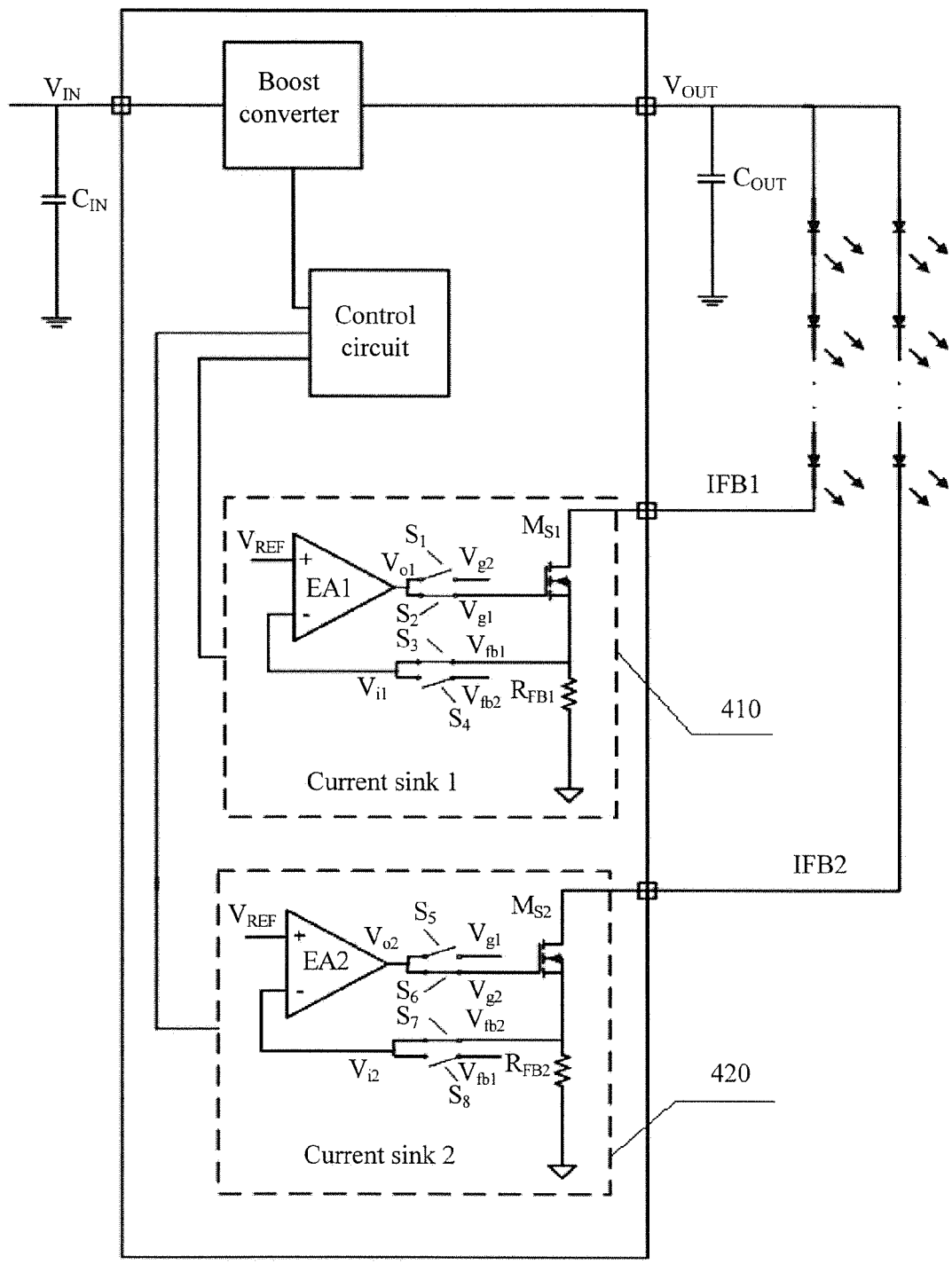
FIG. 5 is another schematic diagram of a WLED driver according to the present invention.

Referring to FIG. 5, which shows another schematic structural diagram of a WLED driver according to the present invention, the WLED driver includes only a first channel IFB1 and a second channel IFB2, where the first channel IFB1 includes a first CS module 410 (hereinafter the CS1 module for short), and the second channel IFB2 includes a second CS module 420 (hereinafter the CS2 module for short).

In this embodiment, the WLED driver includes a total of eight switches, where the CS1 module includes four switches, and the CS2 module includes four switches. Herein, in the present invention, a switch between an output end of an EA1 in the CS1 module and a gate of an NMOS transistor in the CS2 module is defined as S1, a switch between the output end of the EA1 in the CSi module and a gate of an NMOS transistor in the CS1 module is defined as S2, a switch between a negative input end of the EA1 in the CS1 module and a positive input end of a feedback resistor $R_{FB1}$ in the CS1 module is defined as S3, and a switch between the negative input end of the EA1 in the CS1 module and a positive input end of a feedback resistor $R_{FB2}$ in the CS2 module is defined as S4.

Likewise, a switch between an output end of an EA2 in the CS2 module and the gate of the NMOS transistor in the CS1 module is defined as S5, a switch between the output end of the EA2 in the CS2 module and the gate of the NMOS transistor in the CS2 module is defined as S6, a switch between a negative input end of the EA2 in the CS2 module and the positive input end of the feedback resistor $R_{FB2}$ in the CS2 module is defined as S7, and a switch between the negative input end of the EA2 in the CS2 module and the positive input end of the feedback resistor $R_{FB1}$ in the CS1 module is defined as S8.

Figure 6:
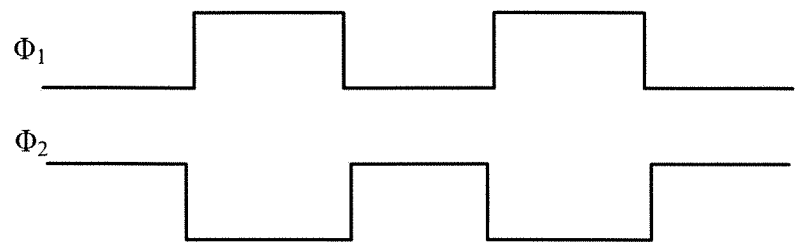
FIG. 6 is another schematic waveform diagram of a clock control signal group $\Phi_{group}$ according to the present invention.

In this embodiment, a clock control signal group $\Phi_{group}=(\Phi_1, \Phi_2)$, that is, the eight switches in this embodiment are controlled by a clock signal $\Phi_1$ and a clock signal $\Phi_2$. Specifically, the clock signal $\Phi_1$ and the clock signal $\Phi_2$ are non-overlapping two-phase clock signals of a same source, as shown in FIG. 6. When the clock signal $\Phi_1$ is at a high level, the S2, S3, S6, and S7 are turned on, and S1, S4, S5, and S8 are turned off. When the clock signal $\Phi_2$ is at a high level, S2, S3, S6, and S7 are turned off, and S1, S4, S5, and S8 are turned on.

In this embodiment, assuming that resistances of the feedback resistor $R_{FB1}$ and the feedback resistor $R_{FB2}$ are equal, and that loop gains of the CS1 module and the CS2 module are high enough, and that input offset voltages of the EA1 and the EA2 are $V_{OS1}$ and $V_{OS2}$ respectively, then in a clock period T, average currents flowing through the CS1 module and the CS2 module are respectively as follows:

$$I_{S1\_AVG} = \frac{1}{2}\left(\frac{V_{REF}+V_{OS1}}{R_{FB1}} + \frac{V_{REF}+V_{OS2}}{R_{FB1}}\right) \text{ and}$$

$$I_{S2\_AVG} = \frac{1}{2}\left(\frac{V_{REF}+V_{OS1}}{R_{FB2}} + \frac{V_{REF}+V_{OS2}}{R_{FB2}}\right).$$

Apparently, for the channels IFB1 and IFB2, average currents of the channels are irrelevant to the input offset voltage of the EA. So long as a good match of the feedback resistor $R_{FB1}$ and the feedback resistor $R_{FB2}$ is ensured, a problem of an average current mismatch between the channels IFB1 and IFB2 in the WLED driver may be eliminated.

Based on a WLED driver provided by the present invention above, the present invention further provides a drive control method for a WLED driver, applied to a WLED driver. The WLED driver includes N channels, where N is a positive integer that is greater than 1, and each channel includes a CS module, where the CS module is configured to drive a WLED string.

The CS module includes an error amplifier EA, an NMOS transistor, and a feedback resistor. Each CS module includes 2N switches, and the WLED driver includes a total of $2N^2$ switches. Specifically, one end of each of N switches in the 2N switches included in the CS module is connected to an output end of the error amplifier, another end of each of the N switches is connected to a gate of each of N NMOS transistors, one end of each of remaining N switches is connected to a negative input end of the error amplifier, and another end of each of the remaining N switches is connected to a positive input end of each of N feedback resistors. The $2N^2$ switches constitute a switch matrix $S_G=S_g(i, j)$ and a switch matrix $S_{FB}=S_{fb}(i, j)$, where $S_g(i, j)$ is a switch between an output end of an error amplifier in an $i^{th}$ CS module and a gate of an NMOS transistor in a $j^{th}$ CS module, $S_{fb}(i, j)$ is a switch between a negative input end of the error amplifier in the $i^{th}$ CS module and a positive input end of a feedback resistor in the $j^{th}$ CS module, and both i and j are positive integers that are less than or equal to N.

Figure 7:
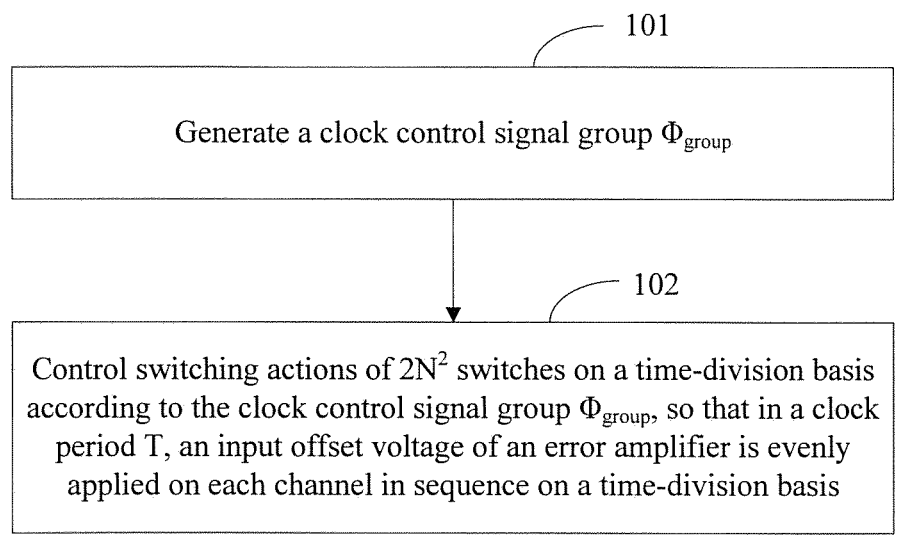
FIG. 7 is a flowchart of a drive control method for a WLED driver according to the present invention.

Specifically, as shown in FIG. 7, the drive control method for a WLED driver includes:

Step 101: Generate a clock control signal group $\Phi_{group}$.

The clock control signal group $\Phi_{group}=(\Phi_1, \Phi_2, \ldots, \Phi_N)$, the clock control signal group $\Phi_{group}$ includes N clock signals $\Phi$, the N clock signals $\Phi$ are non-overlapping N-phase clock signals $\Phi$ of a same source, a clock signal $\Phi_{i+j}$ has a delay of $j\times T/N$ in comparison with $\Phi_i$, and T is a clock period of each phase clock.

Step 102: Control switching actions of $2N^2$ switches on a time-division basis according to the clock control signal group $\Phi_{group}$, so that in a clock period T, an input offset voltage of an error amplifier is evenly applied on each channel in sequence on a time-division basis.

In the present invention, when the WLED driver is working, the switching actions of the $2N^2$ switches are controlled on a time-division basis according to the clock control signal group $\Phi_{group}$.

Specifically, when a clock signal $\Phi_1$ is received, and the $\Phi_1$ is at a high level, control turn-on of switches $[S_g11, S_g22, \ldots, S_gnn]$ in the switch matrix $S_G$, and turn-off of other switches in the switch matrix SG; and control turn-on of switches $[S_{fb}11, S_{fb}22, \ldots, S_{fb}nn]$ in the switch matrix $S_{FB}$, and turn-off of other switches in the switch matrix SG;

when a clock signal $\Phi_2$ is received, and the $\Phi_2$ is at a high level, control turn-on of switches $[S_g12, S_g23, \ldots, S_g(n-1)n, S_gn1]$ in the switch matrix $S_G$, and turn-off of other switches in the switch matrix SG; and control turn-on of switches $[S_{fb}12, S_{fb}23, \ldots, S_{fb}(n-1)n, S_{fb}n1]$ in the switch matrix $S_{FB}$, and turn-off of other switches in the switch matrix SG;

when a clock signal $\Phi_1$ is received, and the $\Phi_i$ is at a high level, control turn-on of switches $[S_g1i, S_g2(i+1), \ldots, S_g(n-i+1)n, S_g(n-i+2)1, \ldots, S_gn(i-1)]$ in the switch matrix $S_G$, and turn-off of other switches in the switch matrix SG; and control turn-on of switches $[S_{fb}1i, S_{fb}2(i+1), \ldots, S_{fb}(n-i+1)n, S_{fb}(n-i+2)1, \ldots, S_{fb}n(i-1)]$ in the switch matrix $S_{FB}$, and turn-off of other switches in the switch matrix SG; and when a clock signal $\Phi_N$ is received, and the $\Phi_N$ is at a high level, control turn-on of switches $[S_g1n, S_g21, \ldots, S_g(n-1)(n-2), S_gn(n-1)]$ in the switch matrix $S_G$, and turn-off of other switches in the switch matrix SG; and control turn-on of switches $[S_{fb}1n, S_{fb}21, \ldots, S_{fb}(n-1)(n-2), S_{fb}n(n-1)]$ in the switch matrix $S_{FB}$, and turn-off of other switches in the switch matrix SG.

Preferably, in the present invention, N is equal to 2, 3, or 4.

It should be noted that the embodiments in this specification are all described in a progressive manner, and that each embodiment focuses on a difference from other embodiments. For same or similar parts in the embodiments, reference may be made to these embodiments. The embodiment of the drive control method for a WLED driver is basically similar to the embodiment of a WLED driver, and therefore is described briefly. For related parts, reference may be made to partial descriptions in the embodiment of a WLED driver.

In the end, it should be noted that in this specification, relational terms such as first and second are only used to distinguish one entity or operation from another, and do not necessarily require or imply that any actual relationship or sequence exists between these entities or operations. Moreover, the terms "include", "include", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the existence of additional identical elements in the process, method, article, or apparatus that includes the element.

The WLED driver and drive control method provided in the embodiments of the present invention are described in detail above. The principle and implementation of the present invention are described herein through specific examples. The description about the embodiments of the present invention is merely provided to help understand the method and core ideas of the present invention. In addition, persons of ordinary skill in the art can make variations and modifications to the present invention in terms of the specific implementations and application scopes according to the ideas of the present invention. Therefore, the content of specification shall not be construed as a limit to the present invention.

What is claimed is:

1. A White Light Emitting Diode (WLED) driver, comprising:
N channels, wherein N is a positive integer that is greater than 1, and each channel comprises a current sink (CS) module configured to drive a WLED string, wherein each CS module comprises an error amplifier (EA), an n-type metal-oxide-semiconductor (NMOS) transistor, and a feedback resistor;
at least $2N^2$ switches, wherein each CS module comprises 2N switches, the $2N^2$ switches constitute a switch matrix $S_G=S_g(i, j)$ and a switch matrix $S_{FB}=S_{fb}(i, j)$, and wherein $S_g(i, j)$ is a switch between an output end of an EA in an $i^{th}$ CS module and a gate of an NMOS transistor in a $j_{th}$ CS module, $S_{fb}(i, j)$ is a switch between a negative input end of the EA in the $i^{th}$ CS module and a positive input end of a feedback resistor in the $j^{th}$ CS module, and both i and j are positive integers that are less than or equal to N;
a boost converter configured to regulate an output voltage of the WLED driver according to a maximum quantity of WLEDs in a WLED string corresponding to any channel;
wherein one end of each of N switches in the 2N switches comprised in the CS module is connected to an output end of the error amplifier, another end of each of the N switches is connected to a gate of each of N NMOS transistors, one end of each of remaining N switches is connected to a negative input end of the error amplifier, another end of each of the remaining N switches is connected to a positive input end of each of N feedback resistors, and the CS module is configured to determine an intensity of a current flowing through the WLED string corresponding to the channel; and
a control circuit configured to generate a clock signal group $\Phi_{group}$ and control switching actions of the $2N^2$ switches on a time-division basis according to the clock control signal group $\Phi_{group}$, so that in a clock period T, an input offset voltage of the error amplifier is evenly applied on each channel in sequence on a time-division basis, wherein the clock signal group $\Phi_{group}=(\Phi_1, \Phi_2, \ldots, \Phi_N)$, the clock control signal group $\Phi_{group}$ comprises m N clock signals $\Phi$, the N clock signals $\Phi$ are non-overlapping N-phase clock signals $\Phi$ of a same source, a clock signal $\Phi_{i+j}$ has a delay of j×T/N in comparison with $\Phi_i$, and T is a clock period of each phase clock.

2. The WLED driver according to claim 1, wherein the control circuit is configured to:
control, according to the clock signal $\Phi_i$, turn-on of switches in $[S_g1i, S_g2(i+1), \ldots, S_g(n-i+1)n, S_g(n-i+2)1, \ldots, S_gn(i-1)]$ in the switch matrix $S_G$, and turn-off of other switches in the switch matrix SG in the switch matrix $S_G$; and
control according to the clock signal $\Phi_i$ turn-on of switches $[S_{fb}1i, S_{fb}2(i+1), \ldots, S_{fb}(n-i+1)n, S_{fb}(n-i+2)1, \ldots, S_{fb}n(i-1)]$ in the switch matrix $S_{FB}$, and turn-off of other switches in the switch matrix SG in the switch matrix $S_{FB}$.

3. A drive control method for use with a White Light Emitting Diode (WLED) driver, wherein the WLED driver comprises N channels, wherein N is a positive integer that is greater than 1, and each channel comprises a current sink (CS) module configured to drive a WLED string, wherein each CS module comprises an error amplifier (EA), an n-type metal-oxide-semiconductor (NMOS) transistor, a feedback resistor and 2N switches, and the WLED driver further comprises a total of $2N^2$ switches, wherein one end of each of N switches in the 2N switches comprised in the CS module is connected to an output end of the EA, another end of each of the N switches is connected to a gate of each of N NMOS transistors, one end of each of remaining N switches is connected to a negative input end of the EA, another end of each of the remaining N switches is connected to a positive input end of each of N feedback resistors, and the $2N^2$ switches constitute a switch matrix $S_G=S_g(i, j)$ and a switch matrix $S_{FB}=S_{fb}(i, j)$, wherein $S_g(i, j)$ is a switch between an output end of an error amplifier in an $i^{th}$ CS module and a gate of an NMOS transistor in a $j^{th}$ CS module, $S_{fb}(i, j)$ is a switch between a negative input end of the error amplifier in the $i^{th}$ CS module and a positive input end of a feedback resistor in the $j^{th}$ CS module, and both i and j are positive integers that are less than or equal to N, the method comprising:
generating a clock control signal $\Phi_{group}$, wherein the clock control signal group $\Phi_{group}=(\Phi_1, \Phi_2, \ldots, \Phi_N)$ and comprises N clock signals $\Phi$, the N clock signals $\Phi$ are non-overlapping N-phase clock signals $\Phi$ of a same source, a clock signal $\Phi_{i+j}$ has a delay of j×T/N in comparison with $\Phi_i$, and T is a clock period of each phase clock; and
controlling switching actions of the $2N^2$ switches on a time-division basis according to the clock control signal group $\Phi_{group}$, so that in a clock period T, an input offset voltage of the error amplifier is evenly applied on each channel in sequence on a time-division basis.

4. The method according to claim 3, wherein controlling switching actions of the $2N^2$ switches on a time-division basis according to the clock control signal group $\Phi_{group}$ comprises:
controlling, according to the clock signal $\Phi_i$, turn-on of switches in $[S_g1i, S_g2(i+1), \ldots, S_g(n-i+1)n, S_g(n-i+2)1, \ldots, S_gn(i-1)]$ in the switch matrix $S_G$, and turn-off of other switches in the switch matrix SG in the switch matrix $S_G$; and controlling turn-on of switches $[S_{fb}1i, S_{fb}2(i+1), \ldots, S_{fb}(n-i+1)n, S_{fb}(n-i+2)1, \ldots, S_{fb}n(i-1)]$ in the switch matrix $S_{FB}$, and turn-off of other switches in the switch matrix SG in the switch matrix $S_{FB}$.

* * * * *